United States Patent [19]

Rots

[11] Patent Number: 4,987,520
[45] Date of Patent: Jan. 22, 1991

[54] ELECTRONIC COMPONENT, ELECTROLYTIC CAPACITOR AND METAL HOUSING

[75] Inventor: Johannes A. M. Rots, Zwolle, Netherlands

[73] Assignee: U.S. Philips Corp., New York, N.Y.

[21] Appl. No.: 380,161

[22] Filed: Jul. 14, 1989

[30] Foreign Application Priority Data

Jul. 22, 1988 [NL] Netherlands ............... 8801853

[51] Int. Cl.$^5$ ............................................. H01G 9/00
[52] U.S. Cl. ............................................. 361/521
[58] Field of Search ............... 361/272, 517, 518, 519, 361/521; 220/89 A

[56] References Cited

U.S. PATENT DOCUMENTS

| | | | |
|---|---|---|---|
| 4,175,166 | 11/1979 | Rosanky | 429/56 |
| 4,484,691 | 11/1984 | Lees | 220/89 A |
| 4,513,873 | 4/1985 | Klaschka | 220/89 A |
| 4,576,303 | 3/1986 | Mundt | 220/89 A |
| 4,617,611 | 10/1986 | Miura et al. | 361/521 |

FOREIGN PATENT DOCUMENTS

| | | | |
|---|---|---|---|
| 51272 | 5/1982 | European Pat. Off. | 361/521 |
| 3543215 | 6/1987 | Fed. Rep. of Germany. | |
| 2579833 | 10/1986 | France. | |

*Primary Examiner*—Donald A. Griffin
*Attorney, Agent, or Firm*—William L. Botjer

[57] ABSTRACT

An electronic component comprising an electronic element and a metal housing, which housing is constituted by a sleeve which is closed on at least one side and which has a substantially flat bottom which is provided with an excess pressure protection means in such a way that the dimensions of the housing remain within the desired accurately determined limits, and in which the venting pressure can be accurately determined, is obtained in that at least one notch is provided in the bottom on the outside of the housing and in that the bottom has a corrugation which runs parallel or substantially parallel to the notch.

8 Claims, 3 Drawing Sheets

ELECTRONIC COMPONENT, ELECTROLYTIC CAPACITOR AND METAL HOUSING

BACKGROUND OF THE INVENTION

The invention relates to an electronic component comprising an electronic element and a metal housing, which housing is constituted by a sleeve which is closed on at least one end and which has a predominantly flat bottom in which an excess pressure protection means is arranged which is formed by at least one straight notch in the bottom.

The invention particularly relates to an electrolytic capacitor having such a housing.

The invention also relates to such a housing for an electronic component.

An aluminium housing for an electrolytic capacitor is described in, for example, German Patent Application DE No. 3543215. An excess pressure protection is provided in the bottom in the form of a thin-walled bottom part at the edge of which there is a weakened annular portion on the inside of the housing to which, if desired, a weakened annular portion on the outside of the housing is added.

A disadvantage of this known excess pressure protection is the smal reproducibility of the venting pressure, i.e. of the smallest internal pressure in the electronic component at which the notch opens and the protection starts operating. The use of a straight notch leads an improved reproducibility, but brings about problems as to the dimensional accuracy of the bottom of the housing. For example, in the case of a cylindrical housing having a straight notch in the bottom an out-of-roundness occurs of the other of magnitude of 0.3 mm at a cylinder diameter of 30.0 mm. On account of the necessary mechanical operations and manipulations of the housing during the manufacture of an electronic component an out-of-roundness of less than 0.1 mm is desired in many cases.

SUMMARY OF THE INVENTION

One of the objects of the invention is to provide an electronic component and a housing for such a component, which housing is provided with an excess pressure protection such that the dimensions of the housing remain within the desired accurately defined limits.

In this connection, it is an object of the invention to ensure that the venting pressure can be accurately determined and exhibits a high degree of predictability and reproducibility.

A further object of the invention is to ensure that the ratio between the residual thickness and the venting pressure is as large as possible. This means that at a desired venting pressure the residual thickness of the thinnest portion of the bottom at the location of the notch is as large as possible so that under normal operating conditions of the electronic component the possibility of a leak in the housing is minimized. A particular object of the invention is to attain suitable venting properties, such that the action of the excess pressure protection is not accompanied by a bang, and the contents of the electronic component is not fed out via the protection.

This object is achieved in accordance with the invention by an electronic component and a housing as described in the opening paragraph, which are characterized in that the notch is provided on the outside of the housing and the bottom has a corrugation which extends parallel or substantially parallel to the notch.

The location of the straight notch on the outside contributes to favourable release characteristics and to a suitable reproducibility of the venting pressure. Owing to the presence of a corrugation which extends substantially parallel to the notch, it is attained that in the case of a cylinder diameter of approximately 30 mm an out-of-roundness of less than 0.03 mm can be realized.

If the housing is manufactured in a customary manner by means of extrusion, for example from aluminium, it is efficaceous to manufacture the corrugation and the notch after the extrusion operation in one single process step by means of a notching pin and a die of tool steel. The corrugation and the notch should not be manufactured in the extrusion step because this would adversely affect the reproducibility of the residual thickness.

In a preferred embodiment of the housing in accordance with the invention the notch is formed in the corrugation. Owing to this simple tools can be used to provide the excess pressure protection. The corrugation may be directed both inwards and outwards.

In an extremely suitable embodiment of the housing in accordance with the invention, the excess pressure protection consists of a single notch. Since the stress is largest in the centre of the bottom the most favourable ratio between residual thickness and venting pressure is attained when the notch is provided through the centre of the bottom. This effect is even enhanced if the construction of the housing is selected such that the wall thickness of the bottom is less in the centre than at the edge.

On account of the mechanical strength of the housing the bottom is preferably provided with a thickened annular portion which may be formed both on the inside and on the outside of the housing.

In U.S. Pat. No. 4,175,166 a description is given of a housing for an electronic component which is provided with an excess pressure protection in the form of a notch in a corrugation, but this protection is provided in the side wall of the cylinder. This enables the venting pressure to be accurately controlled but a notch in the side wall is undesirable if the aim is to manufacture a compact electronic component because, for example, on providing a capacitor roll in the cylinder the roll is not to be damaged by the corrugation and the notch in the side wall. Besides, a side-wall valve is more difficult to manufacture and has less favourable venting properties. Moreover, in an extrusion process, as customarily used for the manufacture of the housing, the thickness of the bottom and, hence, the venting pressure is controlled better than the thickness of the side wall.

BRIEF DESCRIPTION OF THE DRAWINGS

The invention will now be explained in greater detail by means of exemplary embodiments and with reference to a drawing, in which:

FIGS. 2a–d and FIGS. 3a–d are front views of a number of different embodiments of the bottom of a housing in accordance with the invention, and in which:

DETAILED DESCRIPTION OF THE PREFERED EMBODIMENTS

EXAMPLES

Figure 1A:
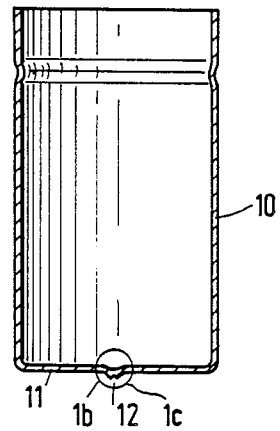
FIGS. 1a–c is a sectional view of two embodiments of a housing having an excess pressure protection in accordance with the invention.

FIG. 1a is a sectional view of a housing 10 for an electronic component, in the form of a sleeve having a predominantly flat bottom 11 in which an excess pressure protection 12 is provided. In accordance with this example the housing is constituted by an aluminium cylinder having a circular circumference. For example, a capacitor roll which is not shown in the drawing may be accommodated in the housing, after which the sleeve can be closed by means of a disc. A suitable capacitor roll is described in, for example, U.S. Pat. No. 3,754,113.

The housing is manufactured, for example, by means of extrusion. The excess pressure protection is manufactured by means of a notching pin and die. The housing is placed around the notching pin and displaced in an axial direction relative to the die which contains a slot to form the corrugation. In the slot there is a cutting tool to form the notch. The impression depth is adjusted by means of stop blocks. The housing preferably consists of a cylinder but may alternatively be square or rectangular in section. Also in this case the dimensional accuracy of the housing can be improved by means of the invention.

Suitable dimensions of the housing are, for example, for the diameter of the cylinder 30 mm, the length of the sleeve 55 mm, the width of the corrugation 2 mm, the release angle of the notch 40°, the wall thickness 0.4 mm, the thickness at the location of the notch 0.1 to 0.15 mm. These dimensions can of course be adapted to the dimensions of the electronic component to be enveloped.

Figure 1B:
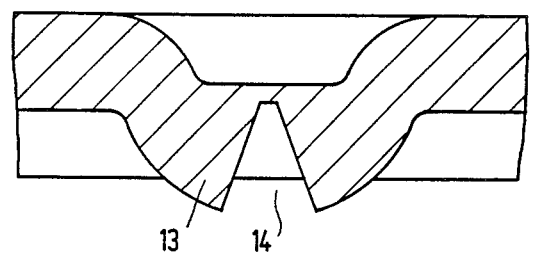
Figure 1C:
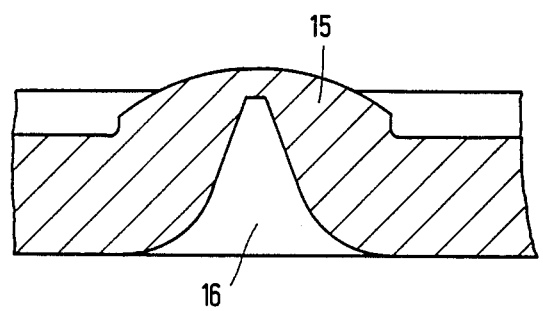
Figure 2A:
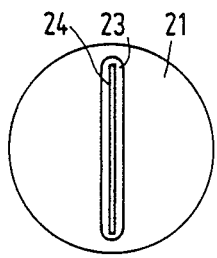
Figure 2B:
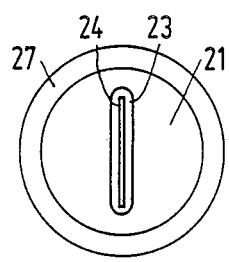
Figure 2C:
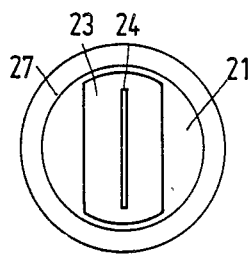
Figure 2D:
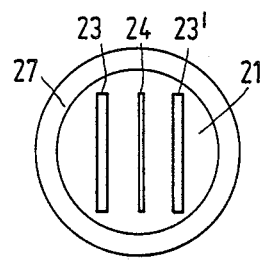
Figure 3A:
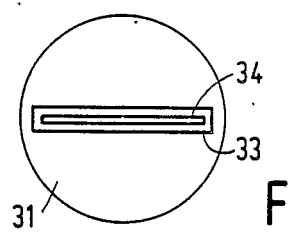
Figure 3B:
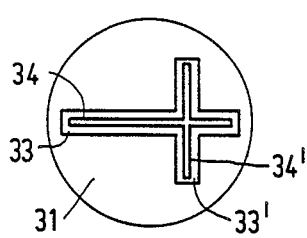
Figure 3C:
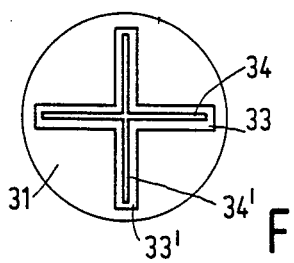
Figure 3D:
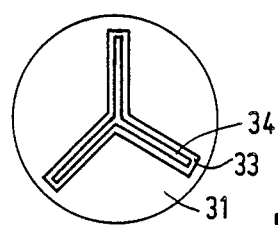
Figure 4A:
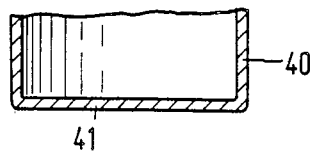
FIGS. 4a–d is a sectional view of a number of embodiments of the bottom of a housing in accordance with the invention.
Figure 4B:
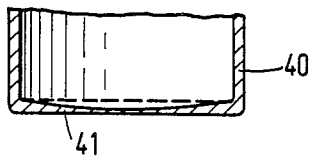
Figure 4C:
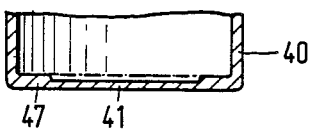
Figure 4D:
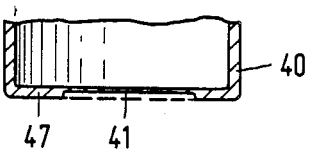

FIGS. 1b and 1c are detailed cross-sectional views of the excess pressure protection in the bottom of the housing. FIG. 1b shows an outwardly directed corrugation 13 having a notch 14 on the outside of the housing. FIG. 1c shows an inwardly directed corrugation 15 having a notch 16 on the outside of the housing.

FIG. 2 is a front view of a number of embodiments of the bottom of a housing in accordance with the invention. In FIG. 2a the bottom 21 is provided with a corrugation 23 in which a notch 24 is formed. In FIG. 2b the same bottom is additionally provided with a thickness annular portion 27 which serves to enhance the strength of the housing and, if desired, additionally contributes to a stable location of the electronic component on the bottom. FIG. 2c shows an embodiment of the bottom which is similar to that of FIG. 2b, with this difference that the width of the corrugation 23 is much larger than that of the notch 24. FIG. 2d shows a bottom 21 having two corrugations 23, 23' which are provided at some distance from a notch 24.

FIG. 3 is a front view of a number of embodiments of the bottom of a housing in accordance with the invention. In FIG. 3a the bottom 31 is provided with a single corrugation 33 having a notch 34 which are provided through the centre of the bottom. FIG. 3b shows a bottom 31 having two intersecting corrugations 33, 33' which are each provided with a notch 34, 34', respectively. FIG. 3c shows a similar embodiment in which the corrugations and the associated notches intersect in the centre of the bottom. FIG. 3d shows a bottom 31 having a star-shaped corrugation 33 which is provided with a star-shaped notch 34.

FIG. 4 is a sectional view of a number of embodiments of the bottom of a housing in accordance with the invention, in which an excess pressure protection which is not shown in the drawing can be provided. FIG. 4a shows a housing 40 having a flat bottom 41. FIG. 4b shows a housing 40 in which the wall thickness of the bottom 41 is smaller in the centre than at the edge. FIG. 4c shows a housing 40 in which the bottom 41 is provided with a thickened annular portion 47 on the inside of the housing. FIG. 4d shows a similar housing in which the thickened annular portion 27 is provided on the outside of the housing.

Various combinations and variants of the embodiment shown are possible, the desired shape of the housing always being accurately retained owing to the presence of a corrugation around or next to the notch.

I claim:

1. An electronic component comprising an electronic element and a metal housing, which housing is constituted by a sleeve which is closed on at least one end and which has a predominantly flat bottom in which an excess pressure protection means is arranged which is formed by at least one straight notch in the bottom, characterized in that the notch is provided on the outside of the housing and that the bottom has a corrugation which extends parallel or substantially parallel to the notch and in that the portion of the corrugation disposed inside the metal housing is free of notches.

2. An electronic component as claimed in claim 1, characterized in that the notch is formed in the corrugation.

3. An electronic component as claimed in claim 1, charaterized in that the excess pressure protection consists of one single notch.

4. An electronic component as claimed in claim 1, characterized in that the notch is provided through the centre of the bottom.

5. An electronic component as claimed in claim 1 4, characterized in that the wall thickness of the bottom is smaller in the centre than at the edge.

6. An electronic component as claimed in claim 5, characterized in that the bottom is provided with a thickened annular portion.

7. An electrolytic capacitor having a metal housing, which housing is constituted by a sleeve which is closed on at least one side and which has a substantially flat bottom in which an excess pressure protection is provided, which excess pressure protection is provided, which excess pressure protection is formed by at least one straight notch, characterized in that the notch is provided on the outside of the housing, that the bottom has a corrugation which extends parallel or substantially parallel to the notch and that the portion of the corrugation inside the housing is free of notches.

8. A metal housing for an electronic component, which housing is constituted by a sleeve which is closed on at least one side and which has a substantially flat bottom in which an excess pressure protection is provided, which pressure protection is formed by at least one straight notch, characterized in that the notch is provided on the outside of the housing, that the bottom has a corrugation which extends parallel or substantially parallel to the notch and that the portion of the corrugation inside the housing is free of notches.

* * * * *